United States Patent [19]

Patterson

[11] 4,162,681
[45] Jul. 31, 1979

[54] FISH-BAIT TANK

[76] Inventor: David L. Patterson, 18951 Walnut St., Fountain Valley, Calif. 92708

[21] Appl. No.: 873,354

[22] Filed: Jan. 30, 1978

[51] Int. Cl.² ............................................. A01K 61/00
[52] U.S. Cl. ...................................... 119/3; 210/169; 261/121 M
[58] Field of Search .............................. 119/3; 43/57; 261/121 M; 210/169

[56] References Cited

U.S. PATENT DOCUMENTS

| 3,374,771 | 3/1968 | Michie et al. | 119/3 X |
| 3,377,991 | 4/1968 | Rubert | 119/3 X |
| 3,418,973 | 12/1968 | Saito | 119/3 |
| 3,717,123 | 2/1973 | Regnier | 119/3 |
| 3,726,251 | 4/1973 | Fremont | 119/3 |

Primary Examiner—Louis G. Mancene
Assistant Examiner—Daniel J. Leach
Attorney, Agent, or Firm—Donald Diamond

[57] ABSTRACT

A fish-bait tank is provided which includes fluid intake and discharge heads integrated with the outer surface of the tank side wall, with the intake head having intake port means and the discharge head having discharge port means. Intake aperture means traverse the tank side wall within the perimeter of the intake head for extending fluid communication from the intake head to the interior of the tank. Discharge aperture means traverse the tank side wall within the perimeter of the discharge head for extending fluid communication from the interior of the tank to the discharge head. Level control means cooperate with the discharge aperture means for selectively controlling fluid level in the housing.

8 Claims, 3 Drawing Figures

FROM WATER SUPPLY

FISH-BAIT TANK

BACKGROUND

This invention relates to fish-bait tanks which are adapted to receive high oxygen water and discharge low oxygen water, on a continuing flow basis, during the period of time such tanks are used as fish-bait reservoirs so as to provide the tanks with a continuous source of oxygenated water.

Heretofore, high oxygen water was generally introduced into a fish-bait tank through an entrance port usually disposed near the bottom of the tank and low oxygen water was withdrawn through a discharge port located near the top of the tank. In this type of tank, the fish-bait tend to bunch or congregate in the vicinity of the entrance port, since they are drawn to this location by the presence of high oxygen water. It would, of course, be desirable and advantageous to provide a fish-bait tank wherein high oxygen water is introduced into the tank at vertically spaced levels so as to obtain more uniform introduction and distribution of such water and thereby enhance and promote vertical apportionment of the bait in the tank. In addition to vertically disposed water ingress means, it would also be advantageous to provide the fish-bait tank with vertically disposed water egress means and level control means which cooperate with the water egress means to permit selective control of the water level in the tank.

SUMMARY OF THE INVENTION

In accordance with this invention, there is provided a bait tank which includes a housing having a perimetrical side wall integrated with a bottom wall. Fluid intake and discharge heads, provided with intake and discharge port means, respectively, are integrated with the outer surface of the housing side wall. Intake aperture means traverse the housing side wall within the perimeter of the intake head for extending fluid communication from the intake head to the interior of the housing. Discharge aperture means traverse the housing side wall within the perimeter of the discharge head for extending communication from the interior of the housing to the discharge head. Level control means are provided which cooperate with the discharge aperture means for selectively controlling fluid level in the housing.

DETAILED DESCRIPTION

Figure 1:
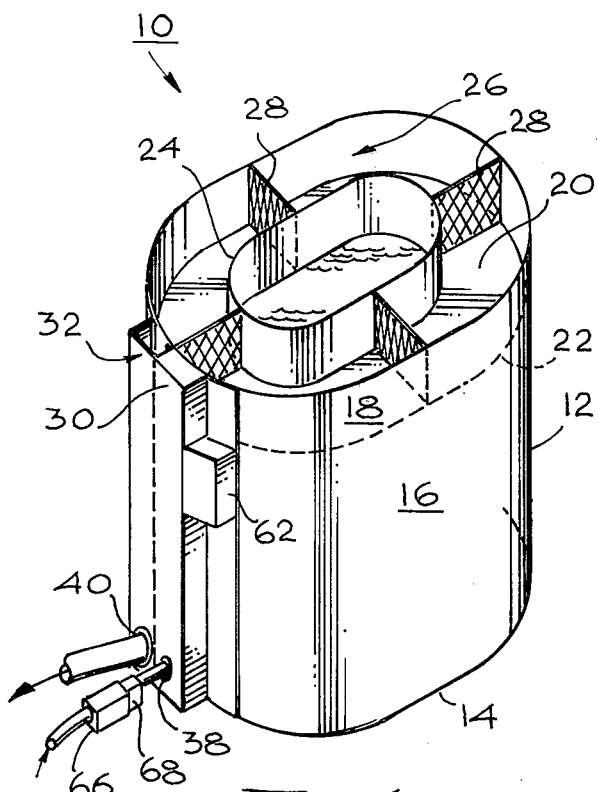
FIG. 1 is a perspective view of the fish-bait tank of the present invention showing the housing, intake and discharge heads and an upper, point of use, bait reservoir channel with the bottom wall thereof defining a splash guard.

Referring now to the drawings and, in particular, to FIG. 1 there is shown a fish-bait tank 10 which comprises a housing having a perimetrical side wall 12 integrated with a bottom wall 14. The side wall of the housing defines a large lower section 16 contiguous with a small upper section 18. A centrally apertured splash guard 20 is integrated with the inner surface of the side wall at a locus defined by the lower end 22 of the side wall upper section. A perimetrical neck 24 extends upwardly from the perimeter of the splash guard central aperture to a height corresponding to about the top of the side wall to define an upper channel 26. This channel is divided into compartments by a plurality of transversely disposed, spaced partitions 28 which extend the height and width of the channel. Each of the partitions is provided with a lattice-type or open-grid structure to permit circulatory fluid flow through the channel.

A fluid intake head 30 and a fluid discharge head 32 are integrated with the outer surface of the housing side wall. The intake and discharge heads are substantially vertically disposed, elongated channel structures which are closed at their lower ends 34, 36 and which, advantageously, have a height corresponding to about the height of the housing side wall. The upper end 33 of the intake head is closed while the upper end 35 of the discharge head is open. The intake and discharge heads are provided, at positions adjacent to their lower ends, with intake and discharge port assemblies 38, 40, respectively. In a preferred embodiment, the intake and discharge heads are in abutting relationship and share a common, middle wall 42.

Vertically spaced intake apertures 44 traverse the lower and upper sections of the housing side wall within the perimeter defined by the intake head for extending fluid communication from the intake head to the interior of the housing. The intake apertures are, advantageously, disposed in suitable spaced relationship throughout the height of the side wall so as to provide means for substantially concurrently introducing high oxygen water at spaced elevations in the housing up to a preselected level. The intake apertures may take the form of relatively small, annular orifices, although size and configuration of the apertures are not criticsl.

Vertically disposed discharge aperture means traverse the lower and upper sections of the housing side wall within the perimeter defined by the discharge head for extending communication from the interior of the housing to the discharge head. The discharge aperture means traversing the upper section of the side wall defines an upper outlet 46 which communicates with the upper channel 26 in the housing. The discharge aperture means traversing the lower section of the housing define a lower outlet which, in a preferred embodiment, comprise lower and upper rows of laterally spaced slots 48a, 48b which essentially permit fluid discharge throughout the height of the side wall lower section.

Figure 3:
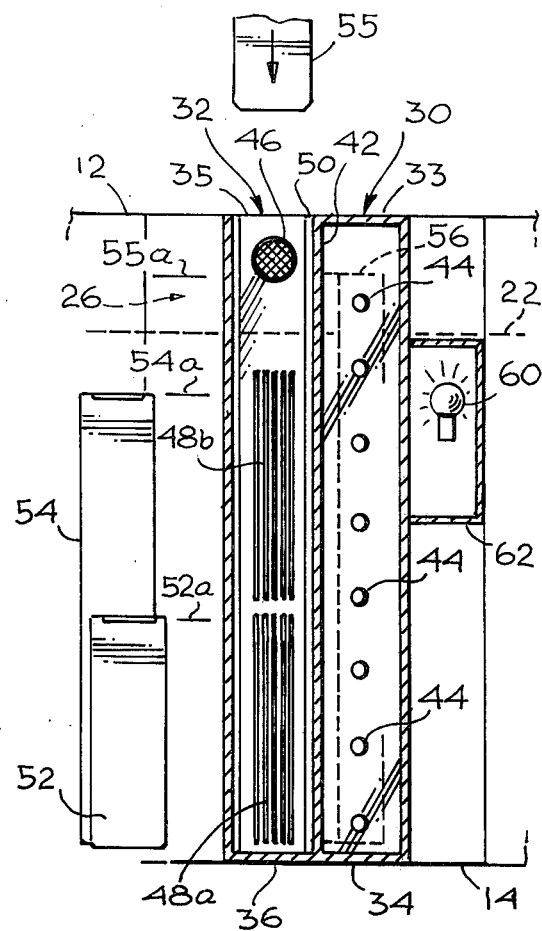
FIG. 3 is a longitudinal section along line 3—3 of FIG. 2 showing the intake and discharge aperture means traversing the housing side wall within the perimeters of the intake and discharge heads, respectively, and further showing level control panels which cooperate with the discharge aperture means to permit selective control of water level in the housing.
Figure 2:
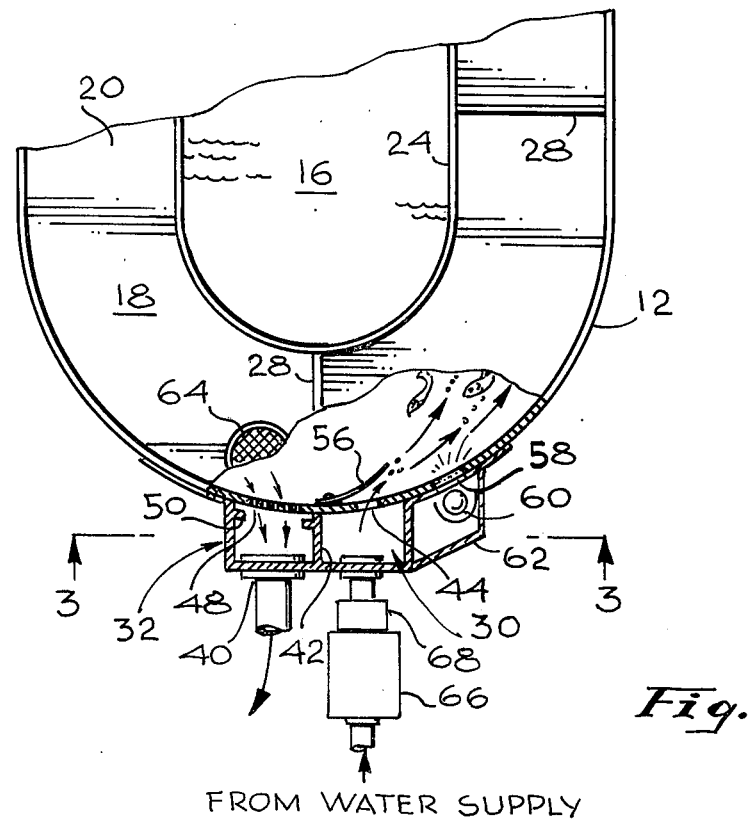
FIG. 2 is a fragmentary, top plan view of the fish-bait tank shown in FIG. 1.

Level control means are provided for selectively controlling fluid level in the housing. The level control means may advantageously comprise oppositely aligned end guides 50 disposed within and integrated with the discharge head adjacent to the side wall and cooperating plates of varying heights insertable into the discharge head between the end guides and the side wall for impeding flow through the lower outlet 48a, 48b to thereby maintain fluid level at a preselected height. As shown in FIG. 3, a first plate 52 will impede flow through the lower row of spaced slots 48a and maintain the water at the level indicated by reference numeral 52a. A second plate 54, which is longer than the first plate, will impede flow through the lower row of spaced slots 48a and through a substantial portion of the upper row of spaced slots 48b to maintain the water at the level indicated by reference numeral 54a. A third plate 55, shown in fragmentary section and showing the manner of longitudinal insertion into the discharge head, is of sufficient length to maintain the water at the level indicated by reference numeral 55a and thereby maintain water in the upper channel 26 of the housing.

A deflector panel 56 is substantially vertically integrated with the inner surface of the side wall at a locus between the intake and discharge apertures. The deflector panel extends outwardly beyond the intake apertures at shallow angle with respect thereto, whereby fluid flowing through the intake apertures impinges on the deflector panel and is directed circumferentially about the interior of the housing for exiting at the discharge aperture.

The bait tank may advantageously be provided with means for illuminating the interior of the housing. In an illustrative embodiment of this feature, the housing is provided with a transparent section 58 and an electric light bulb 60 disposed in a bulb housing 62 which is secured to the outer side of the side wall for illuminating the interior of the housing through the transparent section. A drain plug 64 is provided in the lower end of the housing to permit drainage from the housing. The bait tank may be prepared from any suitable material as, for example, fiberglass resin by employing conventional fabrication techniques.

The bait tank of this invention is particularly adapted for use on sport fishing boats. By providing means for selectively controlling the water level in the tank, a lower level of bait reservoir water can be used during the trip from the dock to the fishing area at which site the water level is raised to provide better access to the bait. The use of a lower level of water during transit to the fishing site is advantageous because it reduces weight on the boat and minimizes splash over in turbulent water.

In using the bait tank, the level of water to be employed during transit from the dock to the fishing site is determined and a flow impeding plate of suitable length is inserted into the discharge head between the end guides and the side wall. High oxygen water, from the ocean or lake, is pumped by means of a suitable pump 66 through fluid flow lines to the intake head 30 where this water is distributed through the intake apertures 44 to the interior of the tank. The bait-fish are then placed in the tank. The lower oxygen water is withdrawn from the tank into the discharge head through the discharge outlet system in the side wall above the flow impeding plate as well as from seepage about the ends of the plate. At the finishing area, a flow impeding plate of appropriate length is placed in the discharge head to raise the water level to a height such that high oxygen water flows into the upper channel 26 and low oxygen water is withdrawn through the upper outlet 46 in the side wall. The bait-fish are then transferred from the lower section of the tank to the various compartments in the upper channel which facilitates ready access to the bait.

A fluid flow sensing device 68 is advantageously located in the intake line between the pump 66 and the intake head 30 for actuating an audible and/or visual signal when the flow rate in the intake line is less than a predetermined reference rate.

While the tanks disclosed herein have been particularly described with respect to their use as fish-bait tanks, they may also be used for storage and/or transportation of various kinds of fresh and salt water sea life.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. A bait tank comprising:
    a housing having a perimetrical side wall integrated with a bottom wall, said side wall having inner and outer surfaces and top and bottom ends;
    a fluid intake head provided with intake port means and a fluid discharge head provided with discharge port means, with each of said intake and discharge heads being integrated with the outer surface of said side wall, said intake and discharge heads having elongated configurations and being substantially vertically and adjacently disposed with the height of each of the intake and discharge heads being about the same as the height of the side wall;
    intake aperture means traversing said side wall and disposed within the perimeter of said intake head for extending fluid communication from said intake head to the interior of said housing, said intake aperture means comprising a plurality of vertically spaced orifices;
    discharge aperture means traversing said side wall and disposed within the perimeter of said discharge head for extending fluid communication from the interior of said housing to said discharge head; and
    level control means cooperating with said discharge aperture means for selectively controlling fluid level in said housing.

2. A bait tank according to claim 1 wherein the side wall of the tank defines a large lower section contiguous with a small upper section, said discharge aperture means comprises lower and upper outlet means, said lower outlet means being disposed in the side wall lower section, said upper outlet means being disposed in said side wall upper section, and said level control means cooperates with said lower outlet means for selectively controlling fluid level in said housing.

3. A bait tank according to claim 2 wherein said level control means comprise oppositely disposed end guides in said discharge head adjacent to said side wall and cooperating plates of varying heights insertable into said discharge head between said end guides and said side wall for impeding flow through said lower outlet means below a preselected height.

4. A bait tank according to claim 3 wherein said lower outlet means comprise upper and lower rows of laterally spaced slots.

5. A bait tank according to claim 3 wherein a deflector panel is vertically integrated with the inner surface of the side wall at a locus between the intake and discharge aperture means, and the deflector panel extends outwardly beyond the intake aperture means at a shallow angle with respect to said intake aperture means, whereby fluid flow into the tank is directed circumferentially about the interior of the tank for exiting at said discharge aperture means.

6. A bait tank according to claim 2 wherein a centrally apertured, splash guard is integrated with the inner surface of the side wall at a locus defined by the lower end of the side wall upper section.

7. A bait tank according to claim 3 wherein a perimetrical neck extends upwardly from the perimeter of the splash guard central aperture to a height corresponding to about the top end of the sidewall to define an upper channel and a plurality of spaced partitions extend the height and width of said channel to divide said channel into separate compartments, with each of said partitions having transverse aperture means for permitting circulatory fluid flow in the channel.

8. A bait tank according to claim 3 wherein said side wall includes a transparent portion, and cooperating illumination means are disposed on the outer side of said side wall for illuminating the interior of said tank through said transparent portion.

* * * * *